US012650777B2

(12) United States Patent
Cheng

(10) Patent No.: US 12,650,777 B2
(45) Date of Patent: Jun. 9, 2026

(54) MEMORY CONTROLLER IN LOW-TEMPERATURE MODE, MEMORY SYSTEM, AND OPERATING METHOD THEREOF

(71) Applicant: YANGTZE MEMORY TECHNOLOGIES CO., LTD., Wuhan (CN)

(72) Inventor: Mo Cheng, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 43 days.

(21) Appl. No.: 18/677,534

(22) Filed: May 29, 2024

(65) Prior Publication Data

US 2025/0362812 A1 Nov. 27, 2025

(30) Foreign Application Priority Data

May 23, 2024 (CN) .......................... 202410658607.2

(51) Int. Cl.
*G06F 3/06* (2006.01)

(52) U.S. Cl.
CPC .......... *G06F 3/0619* (2013.01); *G06F 3/0634* (2013.01); *G06F 3/0653* (2013.01); *G06F 3/0679* (2013.01)

(58) Field of Classification Search
CPC ...... G06F 1/206; G06F 3/0614; G06F 3/0634; G06F 3/0679; G06F 3/0653; G06F 3/0619; G06F 11/1402; G11C 7/04
See application file for complete search history.

(56) References Cited

U.S. PATENT DOCUMENTS

| | | | | |
|---|---|---|---|---|
| 2020/0097217 A1* | 3/2020 | Yeh | .......................... | G11C 16/10 |
| 2020/0126612 A1* | 4/2020 | Mayer | .................... | G11C 11/409 |
| 2024/0069784 A1* | 2/2024 | Basso | ................. | G06F 11/3037 |
| 2024/0126237 A1* | 4/2024 | DeMoss | ............. | G05B 19/4155 |
| 2024/0176506 A1* | 5/2024 | Redaelli | ................ | G06F 3/0619 |
| 2025/0157510 A1* | 5/2025 | Choi | ....................... | G11C 7/106 |
| 2025/0208769 A1* | 6/2025 | Kunduru | ............... | G06F 3/0653 |

FOREIGN PATENT DOCUMENTS

| | | | | | |
|---|---|---|---|---|---|
| CN | 108710475 A | * | 10/2018 | ........... | G06F 3/0679 |
| CN | 113656216 A | * | 11/2021 | ............ | G06F 11/142 |
| CN | 118230774 A | * | 6/2024 | ............... | G11C 7/04 |

* cited by examiner

*Primary Examiner* — Curtis James Kortman
(74) *Attorney, Agent, or Firm* — BAYES PLLC

(57) ABSTRACT

In certain aspects, a memory system includes a memory device, and a memory controller coupled to the memory device. The memory controller is configured to enter a low-temperature mode based on a temperature associated with the memory device, and in the low-temperature mode, control at least one of the memory device or the memory controller to execute a preset idling operation to increase the temperature associated with the memory device.

17 Claims, 9 Drawing Sheets

800

ENTER A LOW-TEMPERATURE MODE BASED ON A TEMPERATURE ASSOCIATED WITH A MEMORY DEVICE — 802

IN THE LOW-TEMPERATURE MODE, CONTROL AT LEAST ONE OF THE MEMORY DEVICE OR THE MEMORY CONTROLLER TO EXECUTE A PRESET IDLING OPERATION TO INCREASE THE TEMPERATURE ASSOCIATED WITH THE MEMORY DEVICE — 804

EXIT THE LOW-TEMPERATURE MODE — 806

TERMINATE THE PRESET IDLING OPERATION — 808

500

<u>600</u>

700

800

MEMORY CONTROLLER IN LOW-TEMPERATURE MODE, MEMORY SYSTEM, AND OPERATING METHOD THEREOF

CROSS-REFERENCE TO RELATED APPLICATIONS

This application claims the benefit of priority to Chinese Application No. 202410658607.2, filed on May 23, 2024, which is incorporated herein by reference in its entirety.

BACKGROUND

The present disclosure relates to memory controllers, memory systems, and operating methods thereof.

Non-volatile storage devices such as solid-state drives (SSDs), non-volatile memory express (NVMe), embedded multimedia cards (eMMCs), and universal flash storage (UFS) devices, etc., have gained significant popularity in recent years due to their numerous advantages over traditional hard disk drives (HDDs), such as faster read and write speed, durability and reliability, reduced power consumption, silent operation, and smaller form factors. For example, non-volatile storage devices such as SSDs may use NAND Flash memory for non-volatile storage. Various operations can be performed by NAND Flash memory, such as read, program (write), and erase.

SUMMARY

In one aspect, a memory system includes a memory device, and a memory controller coupled to the memory device. The memory controller is configured to enter a low-temperature mode based on a temperature associated with the memory device, and in the low-temperature mode, control at least one of the memory device or the memory controller to execute a preset idling operation to increase the temperature associated with the memory device.

In some implementations, the memory controller is configured to, in the low-temperature mode, control the at least one of the memory device or the memory controller to execute the preset idling operation at a portion of a full capacity of the at least one of the memory device or the memory controller, and control the at least one of the memory device or the memory controller to execute a normal operation at a rest of the full capacity of the at least one of the memory device or the memory controller.

In some implementations, the memory controller is further configured to determine the portion of the full capacity based on the temperature.

In some implementations, to control the at least one of the memory device or the memory controller, the memory controller is further configured to execute redundant arithmetic operations.

In some implementations, to control the at least one of the memory device or the memory controller, the memory controller is further configured to cause the memory device to execute redundant read operations.

In some implementations, the memory controller is further configured to obtain the temperature associated with the memory device, and determine to enter the low-temperature mode in response to the temperature being lower than a first threshold temperature when initializing the memory system.

In some implementations, the memory controller is further configured to determine a failure of reading data from the memory device, obtain the temperature associated with the memory device, and determine to enter the low-temperature mode in response to the temperature being lower than a first threshold temperature and the failure of reading data from the memory device.

In some implementations, the memory controller is further configured to receive a first instruction to enter the low-temperature mode from a host. In some implementations, the first instruction is made by the host in response to the temperature being lower than a first threshold temperature.

In some implementations, the memory controller is further configured to exit the low-temperature mode, and terminate the preset idling operation after exiting the low-temperature mode.

In some implementations, the memory controller is configured to determine to exit the low-temperature mode in response to the temperature being higher than a second threshold temperature for a preset time period.

In some implementations, the memory controller is further configured to determine to exit the low-temperature mode in response to a success of reading data from the memory device.

In some implementations, the memory controller is further configured to receive a second instruction to exit the low-temperature mode from a host. In some implementations, the second instruction is made by the host in response to the temperature being higher than a second threshold temperature for a preset time period.

In another aspect, a memory controller includes an interface configured to communicate with a memory device, internal memory configured to store instructions, and a processor coupled to the internal memory and the interface and configured to execute the instructions to perform a process. The process includes entering a low-temperature mode based on a temperature associated with a memory device, and in the low-temperature mode, controlling at least one of the memory device or the memory controller to execute a preset idling operation to increase the temperature associated with the memory device.

In some implementations, the process further includes controlling the at least one of the memory device or the memory controller to execute the preset idling operation at a portion of a full capacity of the at least one of the memory device or the memory controller, and controlling the at least one of the memory device or the memory controller to execute a normal operation at a rest of the full capacity of the at least one of the memory device or the memory controller.

In some implementations, the process further includes determining the portion of the full capacity based on the temperature.

In some implementations, controlling the at least one of the memory device or the memory controller includes executing redundant arithmetic operations.

In some implementations, the interface is further configured to transmit a command to the memory device to cause the memory device to execute redundant read operations.

In some implementations, the process further includes obtaining the temperature associated with the memory device, and determining to enter the low-temperature mode in response to the temperature being lower than a first threshold temperature when initializing the memory device.

In some implementations, the process further includes determining a failure of reading data from the memory device, obtaining the temperature associated with the memory device, and determining to enter the low-temperature mode in response to the temperature being lower than a first threshold temperature and the failure of reading data from the memory device.

In some implementations, the interface is further configured to receive a first instruction to enter the low-temperature mode from a host. In some implementations, the first instruction is made by the host in response to the temperature being lower than a first threshold temperature.

In some implementations, the process further includes exiting the low-temperature mode, and terminating the preset idling operation after exiting the low-temperature mode.

In some implementations, the process further includes determining to exit the low-temperature mode in response to the temperature being higher than a second threshold temperature for a preset time period.

In some implementations, the process further includes determining to exit the low-temperature mode in response to a success of reading data from the memory device.

In some implementations, the interface is configured to receive a second instruction to exit the low-temperature mode from a host. In some implementations, the second instruction is made by the host in response to the temperature being higher than a second threshold temperature for a preset time period.

In still another aspect, a method for operating a memory controller is disclosed. A low-temperature mode is entered based on a temperature associated with a memory device. In the low-temperature mode, at least one of the memory device or the memory controller is controlled to execute a preset idling operation to increase the temperature associated with the memory device.

In some implementations, to control the at least one of the memory device or the memory controller, the at least one of the memory device or the memory controller is controlled to execute the preset idling operation at a portion of a full capacity of the at least one of the memory device or the memory controller, and the at least one of the memory device or the memory controller is controlled to execute a normal operation at a rest of the full capacity of the at least one of the memory device or the memory controller.

In some implementations, the portion of the full capacity is determined based on the temperature.

In some implementations, to control the at least one of the memory device or the memory controller, redundant arithmetic operations are executed.

In some implementations, to control the at least one of the memory device or the memory controller, the memory device is caused to execute redundant read operations.

In some implementations, the temperature associated with the memory device is obtained, and enter the low-temperature mode is determined in response to the temperature being lower than a first threshold temperature when initializing the memory device.

In some implementations, a failure of reading data from the memory device is determined, the temperature associated with the memory device is obtained, and enter the low-temperature mode is determined in response to the temperature being lower than a first threshold temperature and the failure of reading data from the memory device.

In some implementations, a first instruction to enter the low-temperature mode from a host is received. In some implementations, the first instruction is made by the host in response to the temperature being lower than a first threshold temperature.

In some implementations, the low-temperature mode is exited, and the preset idling operation is terminated after exiting the low-temperature mode.

In some implementations, exit the low-temperature mode is determined in response to the temperature being higher than a second threshold temperature for a preset time period.

In some implementations, exit the low-temperature mode is determined in response to a success of reading data from the memory device.

In some implementations, a second instruction to exit the low-temperature mode is received from a host. In some implementations, the second instruction is made by the host in response to the temperature being higher than a second threshold temperature for a preset time period.

In yet another aspect, a non-transitory computer-readable storage medium is disclosed which includes instructions that, when executed by a processing device, cause the processing device to perform a process. The process includes entering a low-temperature mode based on a temperature associated with a memory device, and in the low-temperature mode, controlling at least one of the memory device or a memory controller to execute a preset idling operation to increase the temperature associated with the memory device.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

The present disclosure will be described with reference to the accompanying drawings.

DETAILED DESCRIPTION

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Non-volatile memory devices, such as NAND Flash memory devices, sometimes are used in an extremely cold environment, for example, in mobile devices or vehicles with an outdoor temperature below minus 20 or even 30 degrees Celsius. In an extremely cold environment, mobile devices or vehicles using non-volatile memory devices may not be launched due to the failure of reading system boot files stored in the non-volatile memory devices. Even after launching, read errors may still occur to the non-volatile memory devices caused by the low temperature that exceeds the normal working temperature range when reading data from the non-volatile memory devices. These issues may be caused by the large temperature difference between when the data is programmed into the memory device and when the data is read from the memory device that exceeds the temperature working range/band of the memory devices. These issues are getting worse when the performance of NAND Flash memory devices increases, e.g., with more stacked layers and/or bits per cell.

To address one or more of the aforementioned issues, the present disclosure introduces a low-temperature mode for a memory controller in which the memory controller can cause the temperature associated with the memory device to increase in a cold environment, thereby narrowing the temperature difference between data reading and writing. In the low-temperature mode, the memory controller can control the memory device and/or the memory controller to execute a preset idling operation that can generate heat from the memory device and/or the memory controller to heat up the memory device directly or indirectly, while maintaining the capability of handling normal operations. The present disclosure also provides various schemes for triggering the memory controller to enter and exit the low-temperature mode based on threshold temperatures. As a result, the low-temperature performance of non-volatile memory devices can be significantly improved.

Figure 1:
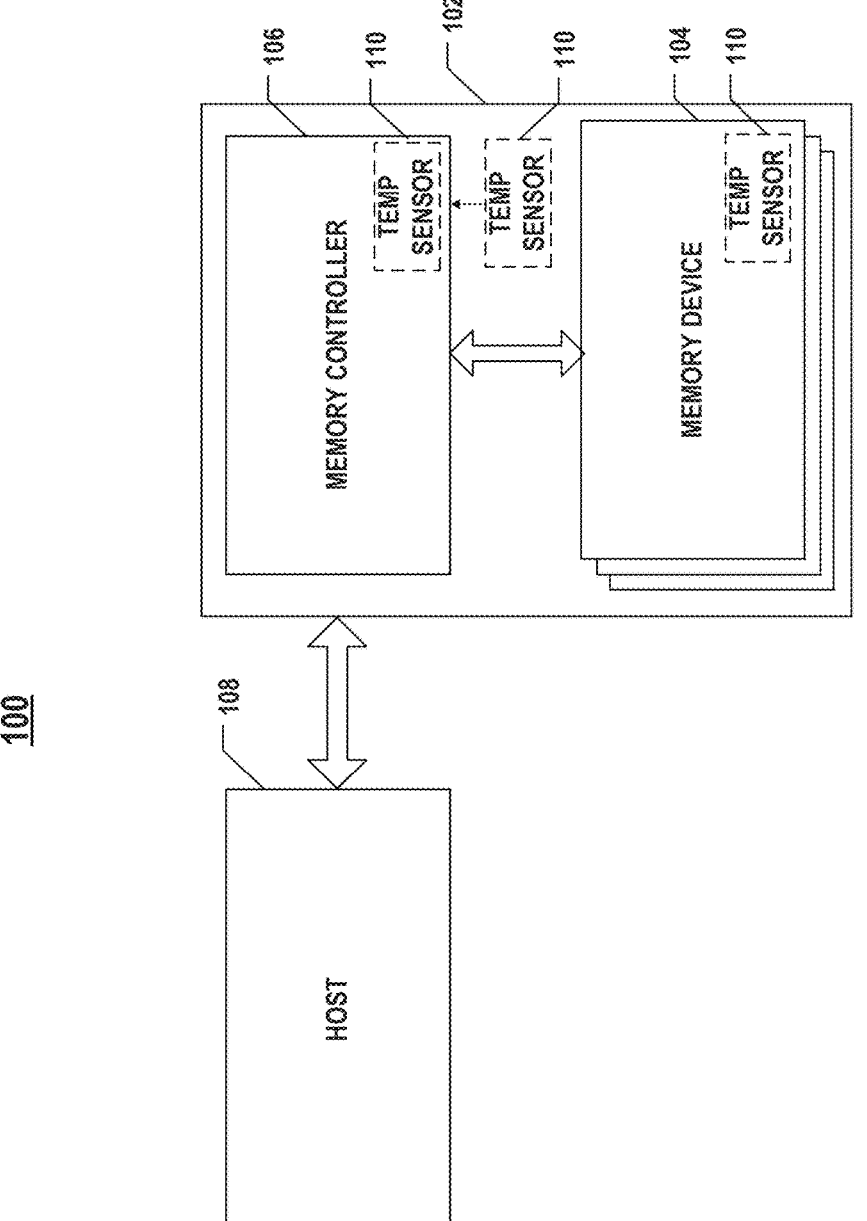
FIG. 1 illustrates a block diagram of a system including a memory system, according to some aspects of the present disclosure.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SSD or a memory card.

Memory devices 104 can be any memory devices disclosed in the present disclosure, including non-volatile memory devices, such as NAND Flash memory devices. In some implementations, memory device 104 also includes one or more volatile memory devices, such as dynamic random-access memory (DRAM) devices or static random-access memory (SRAM) devices.

Memory controller 106 is coupled to memory devices 104 and host 108 and is configured to control memory devices 104, according to some implementations. Memory controller 106 can manage the data stored in memory devices 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment with SSDs or embedded multimedia card (eMMCs) used as data storage for mobile devices, such as smartphones, tablets, laptop computers, etc., vehicles, and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, logical-to-physical (L2P) address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
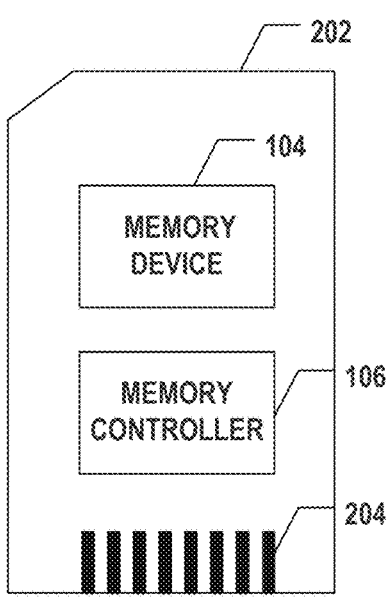
FIG. 2A illustrates a diagram of a memory card having a memory device, according to some aspects of the present disclosure.
Figure 2B:
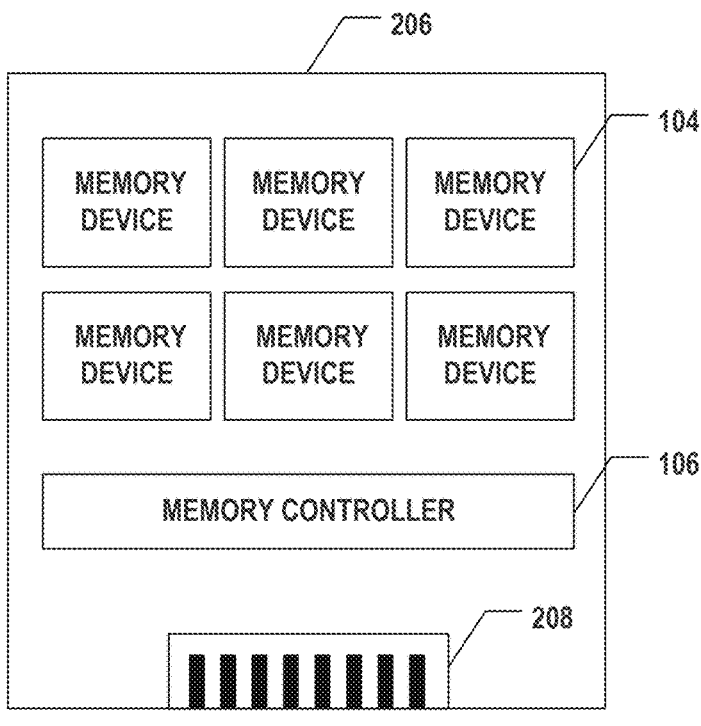
FIG. 2B illustrates a diagram of an SSD having memory devices, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202. In some implementations, memory system 102 is implemented as an SSD 206 that includes both non-volatile memory devices and volatile memory devices as memory devices 104, such as an enterprise SSD.

Referring back to FIG. 1, consistent with the scope of the present disclosure, memory system 102 can also include one or more temperature sensors 110 configured to measure the temperatures associated with memory system 102. Temperature sensors 110 can be any suitable type, such as negative temperature coefficient (NTC) thermistors, thermocouples, resistance temperature detectors (RTDs), semiconductor-based temperature sensors, etc. As shown in FIG. 1, temperature sensor 110 can be integrated to or disposed on memory controller 106, integrated to or disposed on memory device 104, and/or separated from memory controller 106 and 104 within the package of memory system 102. In some implementations, temperature sensor 110 is integrated to or disposed on memory device 104 and configured to measure the temperature of memory device 104 directly. The measured temperature can be transmitted to memory controller 106. In some implementations, temperature sensor 110 is integrated to or disposed on memory device 104 and configured to measure the temperature of memory controller 106 directly. The temperature of memory controller 106 can be converted to the temperature of memory device 104 based on, for example, the distance between memory controller 106 and memory device 104, the thermal conductivity of the medium between memory controller 106 and memory device 104, and the volume of the package enclosing memory controller 106 and memory device 104. In some implementations, temperature sensor 110 is a standalone component separate from memory controller 106 and memory device 104 and configured to measure the ambient temperature within the package of memory system 102. The measured temperature can be transmitted to memory controller 106 as well. Likewise, the ambient temperature can be converted to the temperature of memory device 104 based on, for example, the distance between temperature sensor 110 and memory device 104, the thermal conductivity of the medium between temperature sensor 110 and memory device 104, and the volume of the package enclosing memory controller 106 and memory device 104. In any event, one or more temperature sensors 110 can provide temperatures associated with different parts of memory system 102 to memory controller 106, such that memory controller 106 can obtain the temperature associated with memory device 104. It is understood that in some examples, temperature sensors 110 can provide the measurements to host 108 directly, such that host 108 can obtain the temperature associated with memory device 104.

Figure 3A:
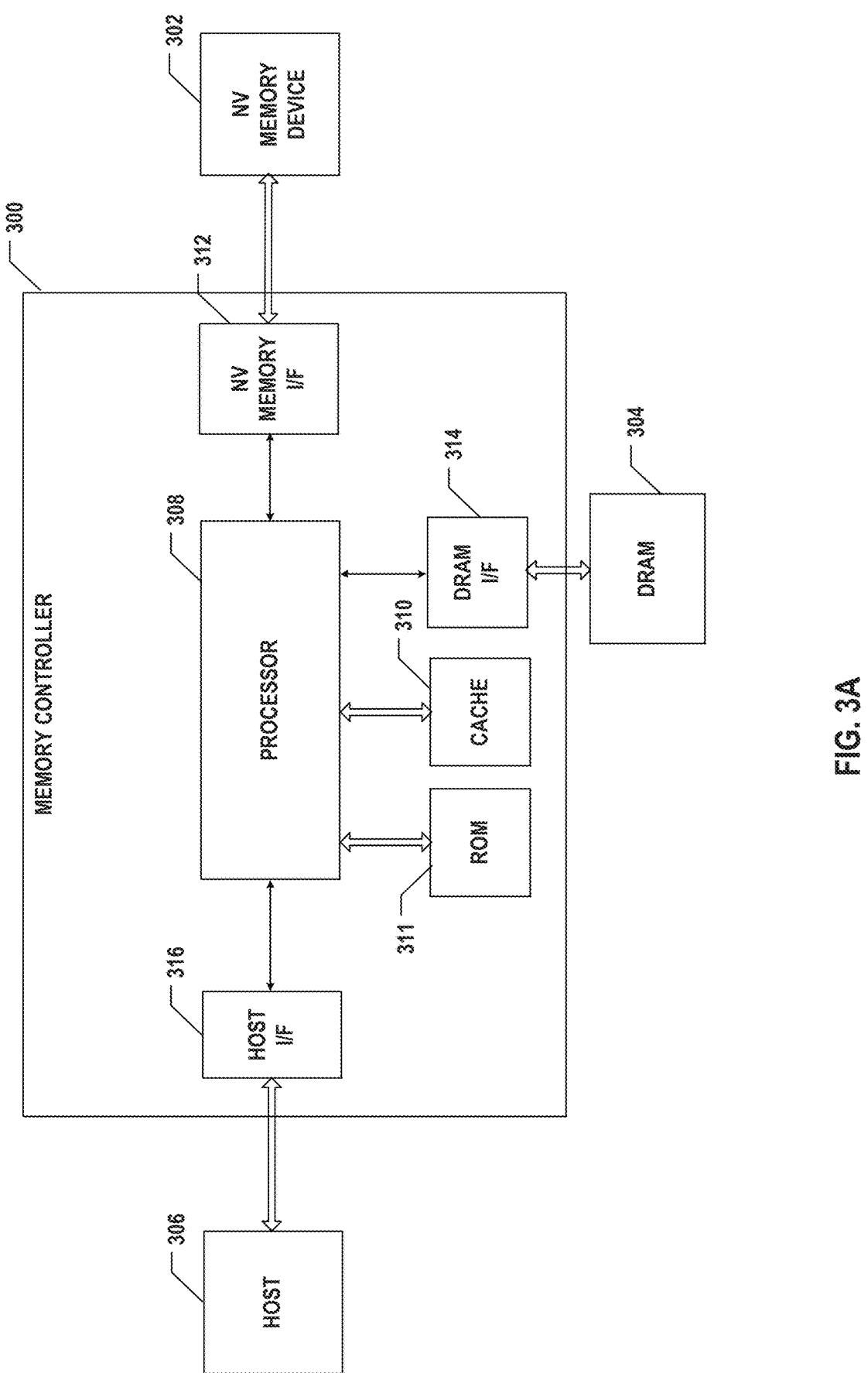
FIG. 3A illustrates a block diagram of a memory controller, according to some aspects of the present disclosure.

FIG. 3A illustrates a block diagram of a memory controller 300, according to some aspects of the present disclosure. Memory controller 300 may be one example of memory controller 106 in FIG. 1. As shown in FIG. 3A, memory controller 300 can include a processor 308 and internal memory including a cache 310 and a read-only memory (ROM) 311. In some implementations, processor 308 is implemented by microprocessors (e.g., digital signal processors (DSPs)) or microcontrollers (a.k.a. microcontroller units (MCUs)) that execute firmware modules to perform the various functions described herein. The various firmware modules in memory controller 300 described herein can be implemented as firmware codes or instructions stored in internal memory, for example, ROM 311, and executed by processor 308. In some implementations, processor 308 includes one or more hardware circuits, for example, fixed logic units such as a logic gate, a multiplexer, a flip-flop, a state machine, field-programmable gate arrays (FPGAs), programmable logic devices (PLDs). For example, the hardware circuits may include dedicated circuits performing a given logic function that is known at the time of device manufacture, such as application-specific integrated circuits (ASICs).

As shown in FIG. 3A, memory controller 300 can also include various input/output (I/O) interfaces (I/F), such as a non-volatile memory interface 312, a DRAM interface 314, and a host interface 316 coupled to a non-volatile memory device 302 (e.g., NAND Flash memory device, an example of memory device 104), DRAM 304 (e.g., an example of volatile memory devices), and a host 306 (e.g., an example of host 108), respectively. Non-volatile memory interface 312, DRAM interface 314, and host interface 316 can be configured to transfer data, command, clock, or any suitable signals between processor 308 and non-volatile memory device 302, DRAM 304, and host 306, respectively. Non-volatile memory interface 312, DRAM interface 314, and host interface 316 can implement any suitable communication protocols facilitating data transfer, communication, and management, such as the NVMe protocol and PCI-E protocol, double data rate (DDR) protocol, to name a few.

Both cache 310 and DRAM 304 may be considered volatile memory devices that can be controlled and accessed by memory controller 300 in a memory system. For example, cache 310 can be implemented as part of volatile memory devices, for example, by an SRAM and/or DRAM 304. It is understood that although FIG. 3A shows that cache 310 is within memory controller 300, and DRAM 304 is outside of memory controller 300. In some examples, both cache 310 and DRAM 304 may be within memory controller 300 or outside of memory controller 300.

Consistent with the scope of the present disclosure and disclosed below in detail, memory controller 300 can be configured to enter a low-temperature mode based on the temperature associated with non-volatile memory device 302, for example, in response to the temperature being lower than a threshold temperature. Memory controller 300 can be further configured to, in the low-temperature mode, control memory controller 300 itself and/or non-volatile memory device 302 to execute a preset idling operation to increase the temperature associated with non-volatile memory device 302, for example, by executing redundant arithmetic operations and/or transmit a command to non-volatile memory device 302 to cause non-volatile memory device 302 to execute redundant read operations. Memory controller 300 is described below in more detail with reference to FIGS. 5-8.

Figure 3B:
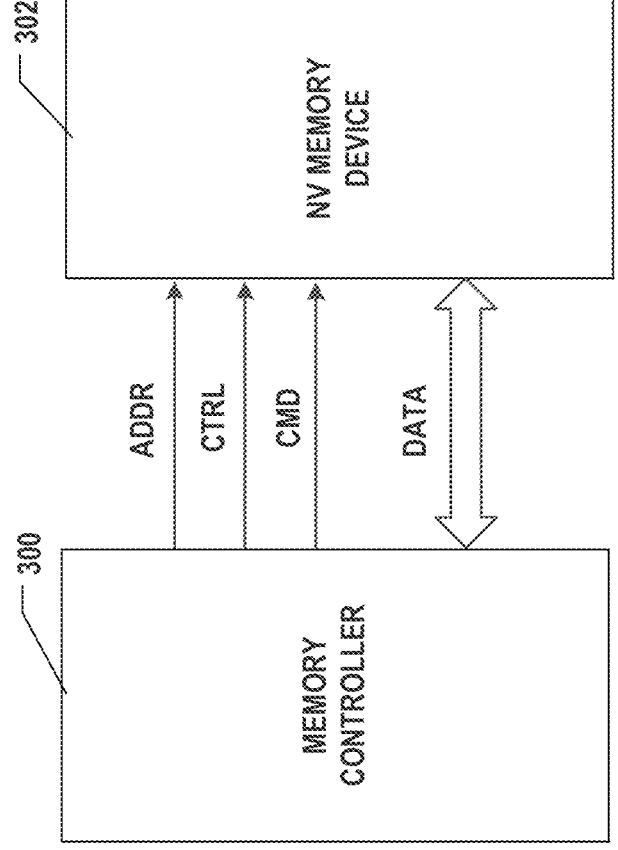
FIG. 3B illustrates example interactions between a memory controller and a non-volatile (NV) memory device, according to some aspects of the present disclosure.

FIG. 3B illustrates example interactions between memory controller 300 and non-volatile memory device 302 of FIG. 3A, according to some aspects of the present disclosure. As described above with respect to FIG. 3A, memory controller 300 can include non-volatile memory interface 312 configured to communicate with non-volatile memory device 302. In some implementations, memory controller 300 may send, through non-volatile memory interface 312, at least one of address (ADDR) signals, control (CTRL) signals, or command (CMD) signals to non-volatile memory device 302. In some implementations, memory controller 300 may receive, through non-volatile memory interface 312, data to be stored in non-volatile memory device 302 from a host (e.g., host 108). Memory controller 300 can send, through non-volatile memory interface 312, a program command as well as the received data to non-volatile memory device 302 for storage. Alternatively or additionally, memory controller 300 can send, through non-volatile memory interface 312, a read command to non-volatile memory device 302 and retrieve data corresponding to the read command from non-volatile memory device 302. Further example interaction between memory controller 300 and non-volatile memory device 302 is illustrated below with reference to FIGS. 5-8.

Referring back to FIG. 3A, in some implementations, in the low-temperature mode, processor 308 of memory controller 300, upon execution of the instructions stored in ROM 311 (e.g., firmware codes), controls non-volatile memory device 302 to execute a preset idling operation at a portion of the full capacity of non-volatile memory device 302. A preset idling operation can include any preset operation of non-volatile memory device 302 that can cause non-volatile memory device 302 to generate heat while still allowing non-volatile memory device 302 to handle normal operations when performing the idling operation. For example, processor 308 may control non-volatile memory interface 312 to transmit a command to non-volatile memory device 302 to cause non-volatile memory device 302 to execute redundant read operations. By executing the redundant read operations itself, non-volatile memory device 302 can generate heat that directly increases its temperature (a.k.a. self-heating). The read operations may be considered "redundant," "dummy," or "idle" as the data read from non-volatile memory device 302 may not need to be transmitted to or used by memory controller 300 and/or host 306, and the read operations may be used for heat-generation purposes only. It is understood that any other suitable preset idling operations besides redundant read operations may be executed by non-volatile memory device 302 in response to receiving the control signals and/or command signals from memory controller 300 in the low-temperature mode.

In some implementations, in order to allow non-volatile memory device 302 to still be able to handle normal operations when memory controller 300 is in the low-temperature mode, processor 308 of memory controller 300, upon execution of the instructions stored in ROM 311 (e.g., firmware codes), determines the portion of the full capacity of non-volatile memory device 302 at which non-volatile memory device 302 executes the preset idling operation based on the temperature associated with non-volatile memory device 302. The rest of the full capacity of non-volatile memory device 302 can thus be reserved for executing normal operations (e.g., regular read, program, or erase operations requested by host 306). The full capacity of non-volatile memory device 302 may refer to all available resources (e.g., data bandwidth, processing power, storage space, etc.) of non-volatile memory device 302 that can handle operations. For example, depending on the difference between the current measured temperature of non-volatile memory device 302 and the target temperature to be increased to (temperature difference), memory controller 300 may determine that a corresponding percentage (e.g., 50%) of the full capacity of non-volatile memory device 302 is to be used for executing redundant read operations to heat up non-volatile memory device 302 to its target temperature, while reserving the remaining parentage (e.g., 50%) of the full capacity of non-volatile memory device 302 for executing normal read operations as needed.

A greater portion of the full capacity of non-volatile memory device 302 can cause non-volatile memory device 302 to execute the preset idling operation in a more aggressive manner, thereby increasing the heating power. On the other hand, if too many resources of non-volatile memory device 302 are used for executing the preset idling operation, the capability of non-volatile memory device 302 to handle normal operations can be jeopardized. Thus, processor 308 of memory controller 300 may need to balance the need to directly heat non-volatile memory device 302 to its target temperature and the need to maintain normal operations of non-volatile memory device 302 at the same time. In some implementations, when determining the split of the available resources of non-volatile memory device 302, processor 308 of memory controller 300 considers the temperature difference (e.g., the higher temperature difference, the more resources for idling operations), the desired time to reach the target temperature (e.g., the shorter time, the more resources for idling operations), as well as the expected amount of normal operations (e.g., the smaller amount, the more resources for idling operations).

Alternatively or additionally, in some implementations, in the low-temperature mode, processor 308 of memory controller 300, upon execution of the instructions stored in ROM 311 (e.g., firmware codes), controls memory controller 300 itself to execute a preset idling operation at a portion of the full capacity of memory controller 300. A preset idling operation can include any preset operation of memory controller 300 that can cause memory controller 300 to generate heat while still allowing memory controller 300 to handle normal operations when performing the idling operation. For example, processor 308 may execute redundant arithmetic operations. The redundant arithmetic operations may be used for data encryption, data decryption, or any other applications. By executing the redundant arithmetic operations, memory controller 300 can generate heat that indirectly increases the temperature of non-volatile memory device 302 by heat transfer, for example, through thermal conduction, thermal convection, and/or thermal radiation inside the package enclosing memory controller 300 and non-volatile memory device 302. The arithmetic operations may be considered "redundant," "dummy," or "idle" as the results or outcomes may not need to be used by memory controller 300, and the arithmetic operations may be used for heat-generation purposes only. It is understood that any other suitable preset idling operations besides redundant arithmetic operations may be executed by memory controller 300 in the low-temperature mode.

In some implementations, in order to allow memory controller 300 to still be able to handle normal operations when memory controller 300 is in the low-temperature mode, processor 308 of memory controller 300, upon execution of the instructions stored in ROM 311 (e.g., firmware codes), determines the portion of the full capacity of memory controller 300 at which memory controller 300 executes the preset idling operation based on the temperature associated with non-volatile memory device 302. The rest of the full capacity of memory controller 300 can thus be reserved for executing normal operations (e.g., regular read, program, or erase operations requested by host 306). The full capacity of memory controller 300 may refer to all available resources (e.g., data bandwidth, processing power, storage space, etc.) of memory controller 300 that can handle operations. For example, depending on the difference between the current measured temperature of non-volatile memory device 302 and the target temperature to be increased to (temperature difference), memory controller 300 may determine that a corresponding percentage (e.g., 50%) of the full capacity of memory controller 300 is to be used for executing redundant arithmetic operations to indirectly heat up non-volatile memory device 302 to its target temperature, while reserving the remaining parentage (e.g., 50%) of the full capacity of memory controller 300 for executing normal read operations as needed.

A greater portion of the full capacity of memory controller 300 can cause memory controller 300 to execute the preset idling operation in a more aggressive manner, thereby increasing the heating power. On the other hand, if too many resources of memory controller 300 are used for executing the preset idling operation, the capability of memory controller 300 to handle normal operations can be jeopardized. Thus, processor 308 of memory controller 300 may need to balance the need to indirectly heat non-volatile memory device 302 to its target temperature and the need to maintain normal operations of memory controller 300 at the same time. In some implementations, when determining the split of the available resources of memory controller 300, processor 308 of memory controller 300 considers the temperature difference (e.g., the higher the temperature difference, the more resources for idling operations), the desired time to reach the target temperature (e.g., the shorter time, the more resources for idling operations), as well as the expected amount of normal operations (e.g., the smaller amount, the more resources for idling operations).

It is understood that in some examples, processor 308 of memory controller 300 may control both memory controller 300 and non-volatile memory device 302 to each execute a respective preset idling operation in parallel in the low-temperature mode, which may increase the efficiency of heating up non-volatile memory device 302.

Consistent with the scope of the present disclosure and disclosed below in detail, memory controller 300 can be configured to implement various schemes to enter and exit the low-temperature mode. Memory controller 300 can terminate the preset idling operation after exiting the low-temperature mode.

In some implementations, processor 308 of memory controller 300 controls memory controller 300 to enter the low-temperature mode when the temperature associated with non-volatile memory device 302 is lower than a preset threshold temperature at the time of initializing non-volatile memory device 302, and also controls memory controller 300 to exit the low-temperature mode when the temperature associated with non-volatile memory device 302 becomes higher than another preset threshold temperature (target temperature) for a preset time period. Processor 308 of memory controller 300 can obtain the temperature associated with non-volatile memory device 302, for example, through one or more temperature sensors 110 shown in FIG. 1. When initializing non-volatile memory device 302 (e.g., when the mobile devices or vehicles having non-volatile memory device 302 is powering up), processor 308 of memory controller 300 can determine to enter the low-temperature mode in response to the temperature associated with non-volatile memory device 302 being lower than a first threshold temperature (e.g., minus 20 or 30 degrees Celsius). The first threshold temperature is preset, indicating an extremely cold environment in which read errors are likely to occur in non-volatile memory device 302, according to some implementations.

As described above, once entering the low-temperature mode, processor 308 of memory controller 300 can control memory controller 300 and/or non-volatile memory device 302 to execute a preset idling operation to increase the temperature associated with non-volatile memory device 302. In the low-temperature mode, processor 308 of memory controller 300 can monitor (continuously or periodically) the temperature associated with non-volatile memory device 302 and determine to exit the low-temperature mode and terminate the idling operation in response to the monitored temperature becoming higher than a second threshold temperature for a preset time period. The second threshold temperature is a preset target temperature, indicating a suitable environment in which non-volatile memory device 302 can function well, according to some implementations. The time period for which the monitored temperature is maintained above the target temperature (e.g., 10 seconds) is preset to avoid random temperature spikes triggering the exit of the low-temperature mode, according to some implementations.

In some implementations, processor 308 of memory controller 300 controls memory controller 300 to enter the low-temperature mode when the temperature associated with non-volatile memory device 302 is lower than a preset threshold temperature at the time, as well as when failure of reading data occurs to non-volatile memory device 302, and also controls memory controller 300 to exit the low-temperature mode when the reading of data from non-volatile memory device 302 becomes successful. Processor 308 of memory controller 300 can determine a failure of reading data from non-volatile memory device 302, for example, by receiving a read error message from non-volatile memory device 302. Processor 308 of memory controller 300 can also obtain the temperature associated with non-volatile memory device 302, for example, through one or more temperature sensors 110 shown in FIG. 1. Processor 308 of memory controller 300 can further determine to enter the low-temperature mode in response to the temperature associated with non-volatile memory device 302 being lower than a first threshold temperature (e.g., minus 20 or 30 degrees Celsius) and the failure of reading data from non-volatile memory device 302. The combination of data read failure and the low device temperature indicates that the cold environment most likely caused the data read failure and thus, needs to be compensated, according to some implementations.

As described above, once entering the low-temperature mode, processor 308 of memory controller 300 can control memory controller 300 and/or non-volatile memory device 302 to execute a preset idling operation to increase the temperature associated with non-volatile memory device 302. In the low-temperature mode, processor 308 of memory controller 300 can monitor (continuously or periodically) the data reading results and determine to exit the low-temperature mode and terminate the idling operation in response to the success of reading data from non-volatile memory device 302, which indicates that non-volatile memory device 302 now can function well in a suitable environment, according to some implementations.

In some implementations, processor 308 of memory controller 300 controls memory controller 300 to enter the low-temperature mode when receiving an instruction from host 306 indicating that the temperature associated with non-volatile memory device 302 is lower than a preset threshold temperature at the time, and also controls memory controller 300 to exit the low-temperature mode when receiving another instruction from host 306 indicating that the temperature associated with non-volatile memory device 302 now becomes higher than another preset threshold temperature (target temperature) for a preset time period. Host 306 can obtain the temperature associated with non-volatile memory device 302, for example, through one or more temperature sensors 110 shown in FIG. 1. Host 306 can also determine that the temperature associated with non-volatile memory device 302 is lower than a first threshold temperature (e.g., minus 20 or 30 degrees Celsius) and thus, send a first instruction to memory controller 300. In response, processor 308 of memory controller 300 can determine to enter the low-temperature mode. The first threshold temperature is preset, indicating an extremely cold environment in which read errors are likely to occur in non-volatile memory device 302, according to some implementations.

As described above, once entering the low-temperature mode, processor 308 of memory controller 300 can control memory controller 300 and/or non-volatile memory device 302 to execute a preset idling operation to increase the temperature associated with non-volatile memory device 302. When memory controller 300 is in the low-temperature mode, host 306 can monitor (continuously or periodically) the temperature associated with non-volatile memory device 302 and determine that the monitored temperature has become higher than a second threshold temperature for a preset time period. Thus, host 306 can send a second instruction to memory controller 300, indicating the same. In response, processor 308 of memory controller 300 can determine to exit the low-temperature mode and terminate the idling operation. The second threshold temperature is a preset target temperature, indicating a suitable environment in which non-volatile memory device 302 can function well, according to some implementations. The time period for which the monitored temperature is maintained above the target temperature (e.g., 10 seconds) is preset to avoid random temperature spikes triggering the exit of the low-temperature mode, according to some implementations.

Figure 4:
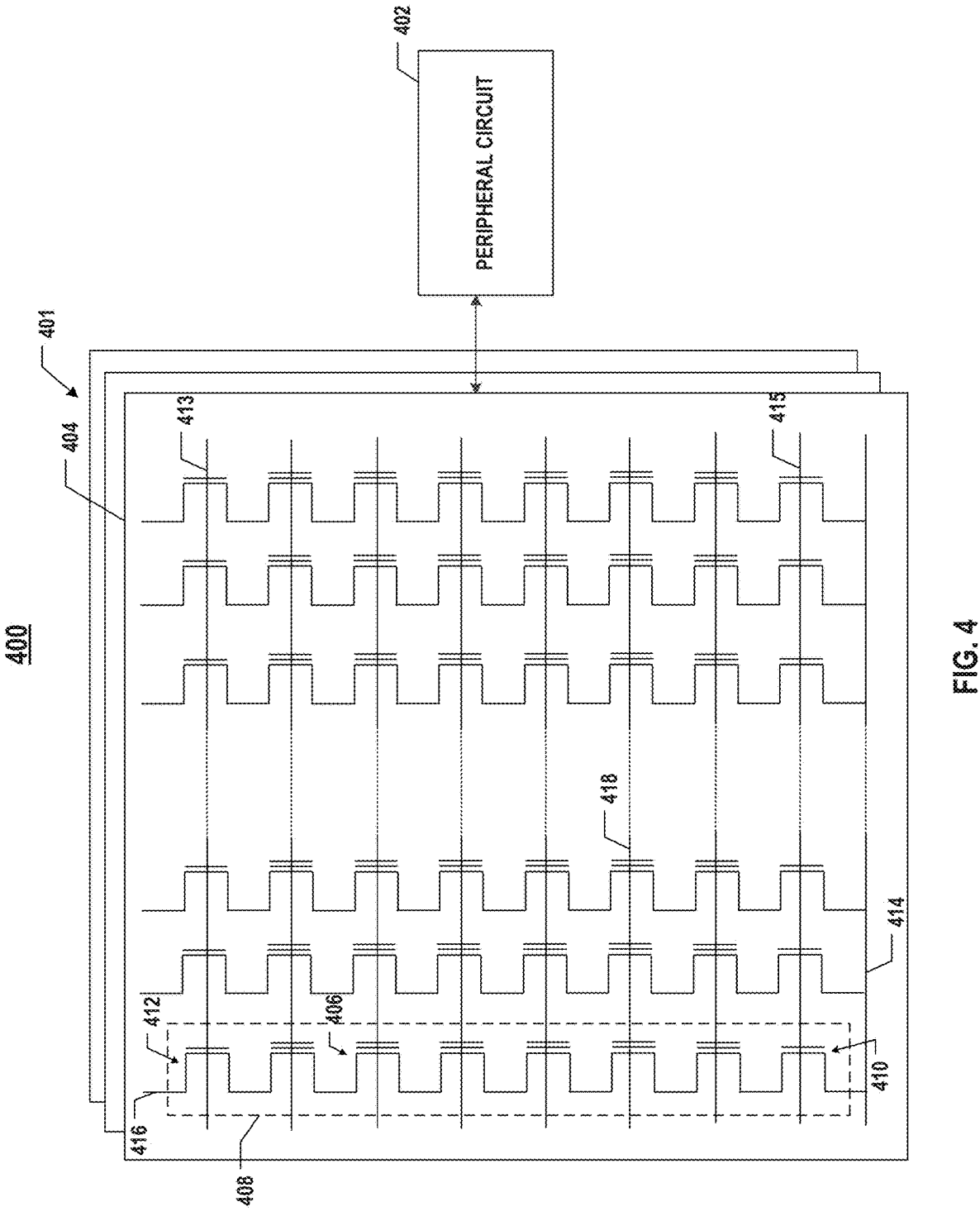
FIG. 4 illustrates a schematic diagram of a NAND Flash memory device including peripheral circuits, according to some aspects of the present disclosure.

FIG. 4 illustrates a schematic circuit diagram of a NAND Flash memory device 400 including peripheral circuits 402, according to some aspects of the present disclosure. NAND Flash memory device 400 may be one example of non-volatile memory device 302 in FIG. 3A. NAND Flash memory device 400 can include a memory cell array 401 and peripheral circuits 402 coupled to memory cell array 401. Memory cells 406 in memory cell array 401 are provided in the form of an array of memory strings 408 each extending vertically above a substrate (not shown). In some implementations, each memory string 408 includes a plurality of memory cells 406 coupled in series and stacked vertically. Each memory cell 406 can hold a continuous, analog value, such as an electrical voltage or charge, which depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible levels (memory states) and thus, can store one bit of data. For example, the first state "0" can correspond to a first range of threshold voltages, and the second state "1" can correspond to a second range of threshold voltages. In some implementations, each memory cell 406 is an xLC that is capable of storing more than a single bit of data in more than four levels. For example, the xLC may store two bits per cell (a.k.a., multi-level cell (MLC)), three bits per cell (a.k.a., triple-level cell (TLC)), or four bits per cell (a.k.a., quad-level cell (QLC)). Each xLC can be programmed to assume a range of possible nominal storage values (i.e., corresponding to $2^N$ pieces of N-bits data). In some implementations, each memory cell 406 is set to one of $2^N$ levels corresponding to a piece of N-bits data, where N is an integer greater than 1. N may denote the total number of bits per cell. For example, N=2 for MLC, N=3 for TLC, or N=4 for QLC.

As shown in FIG. 4, each memory string 408 can also include a source select gate (SSG) transistor 410 at its source end and a drain select gate (DSG) transistor 412 at its drain end. SSG transistor 410 and DSG transistor 412 can be configured to activate select memory strings 408 (columns of the array) during read and program operations. In some implementations, the sources of memory strings 408 in the same block 404 are coupled through a same source line (SL) 414, e.g., a common SL. In other words, all memory strings 408 in the same block 404 have an array common source (ACS), according to some implementations. The drain of each memory string 408 is coupled to a respective bit line 416 from which data can be read or written via an output bus (not shown), according to some implementations. In some implementations, each memory string 408 is configured to be selected or deselected by applying a select voltage or a deselect voltage to the gate of respective DSG transistor 412 through one or more DSG lines 413 and/or by applying a select voltage or a deselect voltage to the gate of respective SSG transistor 410 through one or more SSG lines 415.

As shown in FIG. 4, memory strings 408 can be organized into multiple blocks 404, each of which can have a common source line 414, e.g., coupled to the ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive bias voltage (e.g., 20 V or more).

Memory cells 406 of adjacent memory strings 408 can be coupled through word lines 418 that select which row of memory cells 406 is affected by read and program operations. Each word line 418 can include a plurality of control gates (gate electrodes) at each memory cell 406 coupled to word line 418 and a gate line coupling the control gates.

Peripheral circuits 402 can be operatively coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each select memory cell 406 through bit lines 416, word lines 418, source lines 414, SSG lines 415, and DSG lines 413. Peripheral circuits 402 can include various types of peripheral circuits formed using complementary metal-oxide-semiconductor (CMOS) technologies.

Figure 5:
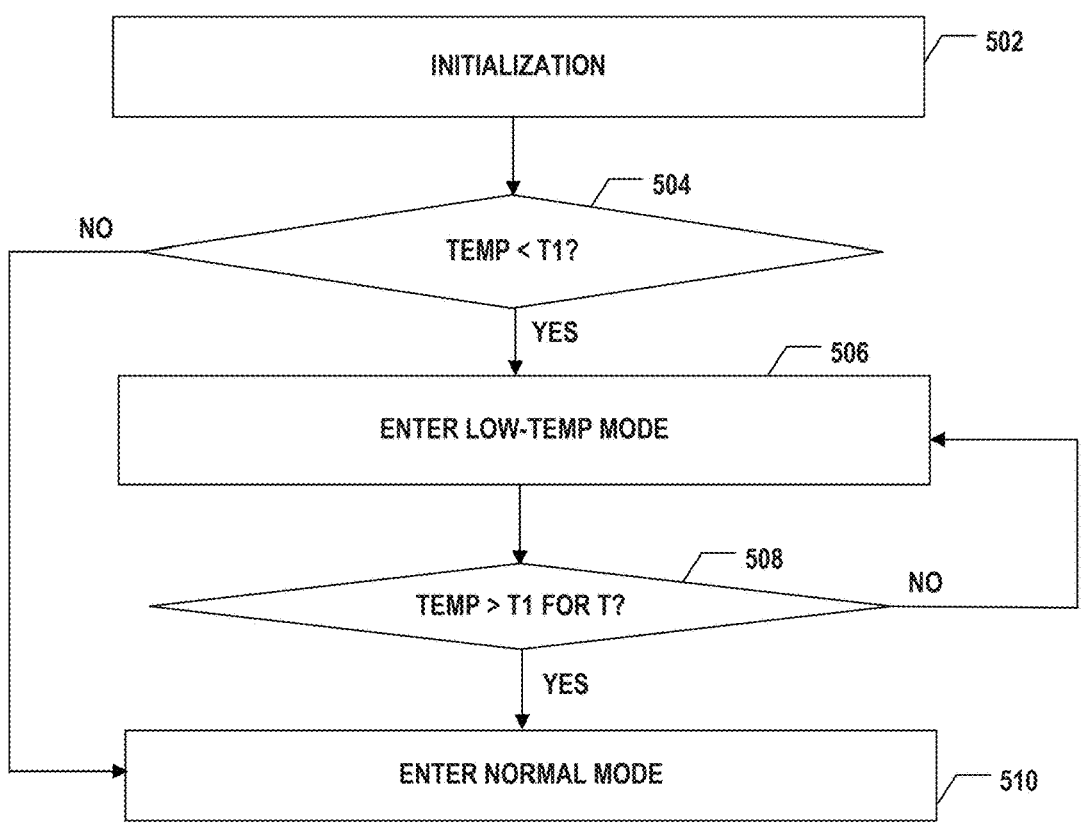
FIG. 5 illustrates an example process for operating a memory system, according to some aspects of the present disclosure.

FIG. 5 illustrates an example process 500 for operating a memory system, according to some aspects of the present disclosure. The memory system may be any suitable memory system disclosed herein, such as memory system 102. By way of examples, FIG. 5 is described below with reference to memory controller 106 and memory device 104 without loss of generality. It is understood that the operations shown in process 500 may not be exhaustive and that other operations can be performed as well before, after, or between any of the illustrated operations. Further, some of the operations may be performed simultaneously, or in a different order than shown in FIG. 5. FIG. 5 illustrates an example of a low-temperature mode triggered by memory controller 106 during system initialization.

At operation 502, memory system 102 (and memory device 104) is initialized, for example, when the mobile devices or vehicles having memory system 102 are turned on. At operation 504, memory controller 106 obtains the temperature associated with memory device 104 TEMP and compares it with a first threshold temperature T1. If the temperature associated with memory device 104 TEMP is not lower than the first threshold temperature T1, at operation 510, memory controller 106 enters the normal mode. If the temperature associated with memory device 104 TEMP is lower than the first threshold temperature T1, at operation 506, memory controller 106 enters the low-temperature mode to increase the temperature associated with memory device 104 TEMP, for example, by controlling memory device 104 and/or memory controller 106 to execute a preset idling operation. At operation 508, memory controller 106 determines whether the temperature associated with memory device 104 TEMP has become higher than a second threshold temperature T2 for a time period T. If so, at operation 510, memory controller 106 exits the low-temperature mode and enters the normal mode. Otherwise, process 500 returns to operation 506 in which memory controller 106 keeps in the low-temperature mode to continue increasing the temperature associated with memory device 104 TEMP.

Figure 6:
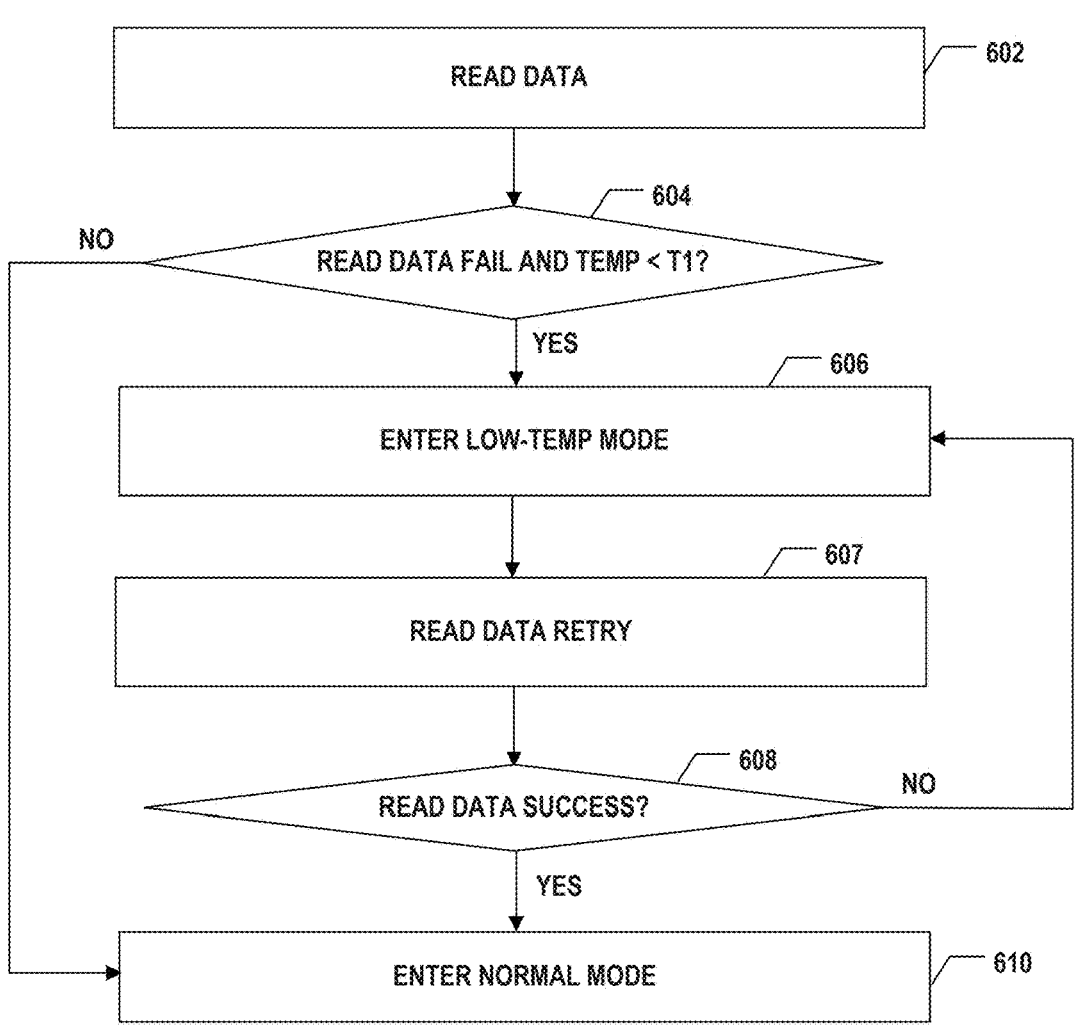
FIG. 6 illustrates another example process for operating a memory system, according to some aspects of the present disclosure.

FIG. 6 illustrates another example process 600 for operating a memory system, according to some aspects of the present disclosure. The memory system may be any suitable memory system disclosed herein, such as memory system 102. By way of examples, FIG. 6 is described below with reference to memory controller 106 and memory device 104 without loss of generality. It is understood that the operations shown in process 600 may not be exhaustive and that other operations can be performed as well before, after, or between any of the illustrated operations. Further, some of the operations may be performed simultaneously, or in a different order than shown in FIG. 6. FIG. 6 illustrates an example of a low-temperature mode triggered by memory controller 106 in response to data read failure.

At operation 602, memory controller 106 reads data from memory device 104. At operation 604, memory controller 106 determines a failure of reading data from memory device 104, as well as obtains the temperature associated with memory device 104 TEMP and compares it with a first threshold temperature T1. If the temperature associated with memory device 104 TEMP is not lower than the first threshold temperature T1, at operation 610, memory controller 106 enters the normal mode. If the temperature associated with memory device 104 TEMP is lower than the first threshold temperature T1, at operation 606, memory controller 106 enters the low-temperature mode to increase the temperature associated with memory device 104 TEMP, for example, by controlling memory device 104 and/or memory controller 106 to execute a preset idling operation. At operation 607, memory controller 106 retries to read data from memory device 104. At operation 608, memory controller 106 determines whether the data reading retry is successful. If so, at operation 610, memory controller 106 exits the low-temperature mode and enters the normal mode. Otherwise, process 600 returns to operation 606 in which memory controller 106 keeps in the low-temperature mode to continue increasing the temperature associated with memory device 104 TEMP.

Figure 7:
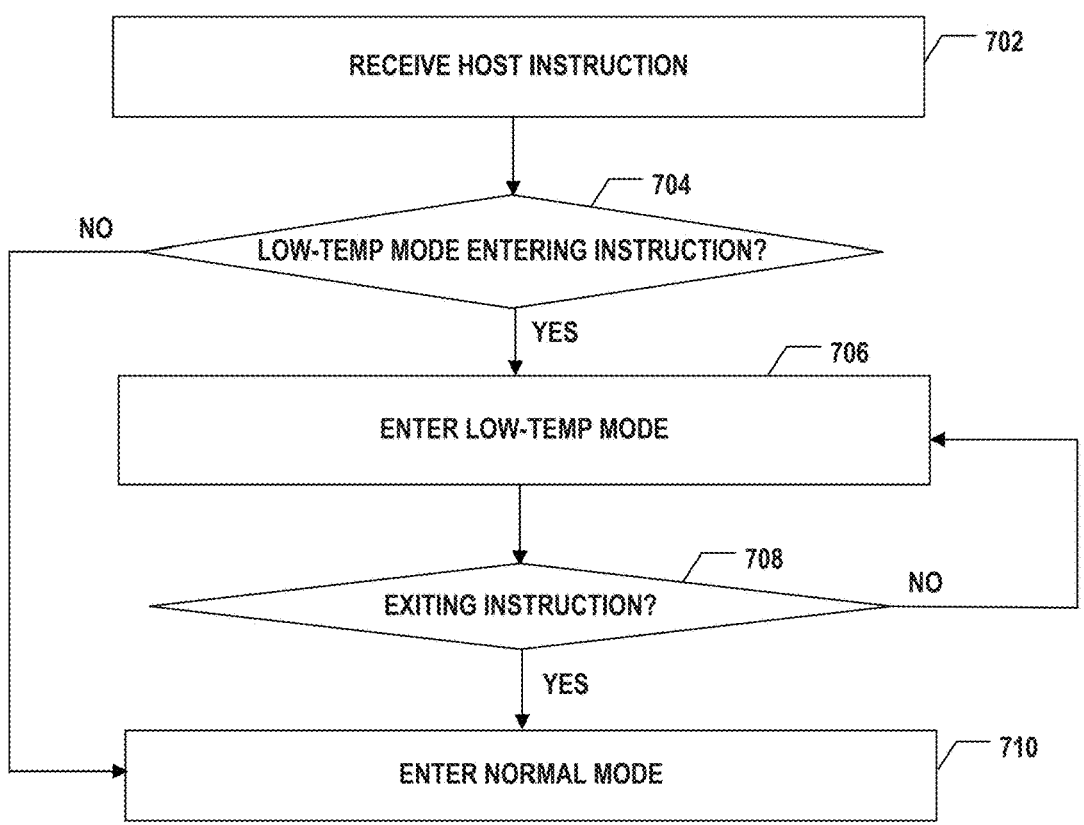
FIG. 7 illustrates still another example process for operating a memory system, according to some aspects of the present disclosure.

FIG. 7 illustrates an example process 700 for operating a memory system, according to some aspects of the present disclosure. The memory system may be any suitable memory system disclosed herein, such as memory system 102. By way of examples, FIG. 7 is described below with reference to memory controller 106 and memory device 104 without loss of generality. It is understood that the operations shown in process 700 may not be exhaustive and that other operations can be performed as well before, after, or between any of the illustrated operations. Further, some of the operations may be performed simultaneously, or in a different order than shown in FIG. 7. FIG. 7 illustrates an example of a low-temperature mode triggered by host 108.

At operation 702, memory system 102 receives instructions from host 108. At operation 704, memory controller 106 determines whether the received instructions include an instruction to enter the low-temperature mode. If not, at operation 710, memory controller 106 enters the normal mode. If so, at operation 706, memory controller 106 enters the low-temperature mode to increase the temperature associated with memory device 104 TEMP, for example, by controlling memory device 104 and/or memory controller 106 to execute a preset idling operation. At operation 708, memory controller 106 determines whether the received instructions include an instruction to exit the low-temperature mode. If so, at operation 710, memory controller 106 exits the low-temperature mode and enters the normal mode. Otherwise, process 700 returns to operation 706 in which memory controller 106 keeps in the low-temperature mode to continue increasing the temperature associated with memory device 104 TEMP.

Figure 8:
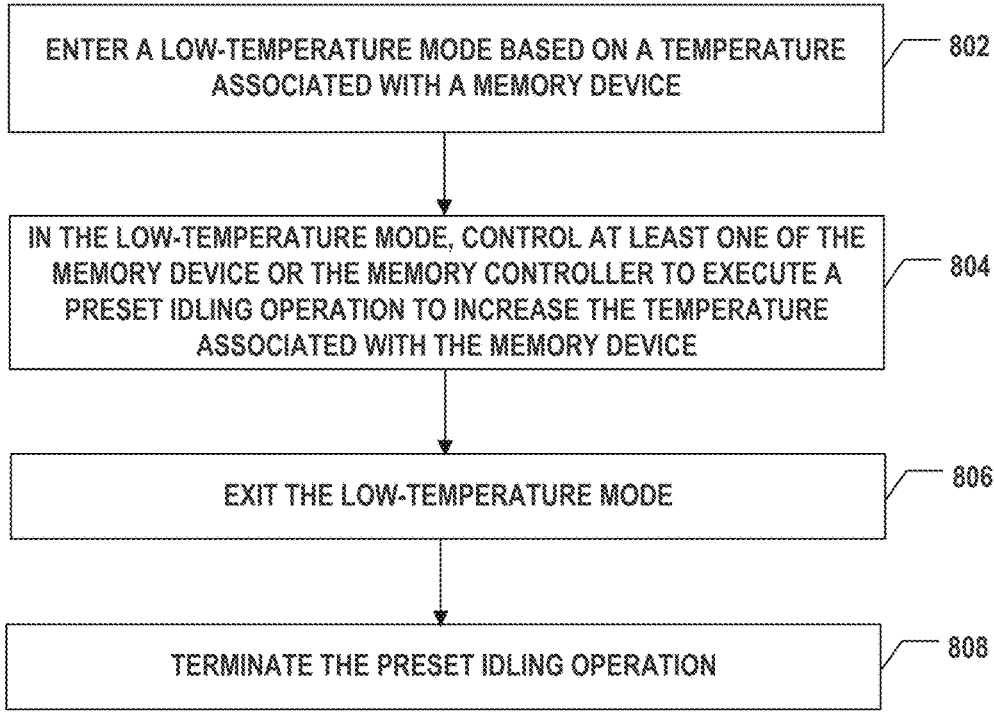
FIG. 8 illustrates a flowchart of a method for operating a memory controller, according to some aspects of the present disclosure.

FIG. 8 illustrates a flowchart of a method 800 for operating a memory controller, according to some aspects of the present disclosure. The memory controller may be any suitable memory controller disclosed herein, such as memory controller 106. The memory controller may be coupled to a memory device and control the operation of the memory device. The memory device may be any suitable memory device disclosed herein, such as memory device 104 (e.g., non-volatile memory device 302). By way of examples, FIG. 8 is described below with reference to memory controller 106, as well as memory device 104 and host 108, without loss of generality. It is understood that the operations shown in method 800 may not be exhaustive and that other operations can be performed as well before, after, or between any of the illustrated operations. Further, some of the operations may be performed simultaneously, or in a different order than shown in FIG. 8.

Referring to FIG. 8, method 800 starts at operation 802, in which a low-temperature mode is entered based on a temperature associated with a memory device. For example, as shown in FIG. 1, memory controller 106 may enter a low-temperature mode based on a temperature associated with memory device 104.

In some implementations, the temperature associated with the memory device is obtained, and it is determined to enter the low-temperature mode in response to the temperature being lower than a first threshold temperature when initializing the memory system. For example, as shown in FIGS. 1 and 5, memory controller 106 may obtain TEMP from temperature sensor 110 and determine to enter the low-temperature mode in response to TEMP being lower than T1 during initialization.

In some implementations, a failure of reading data from the memory device is determined, the temperature associated with the memory device is obtained, and it is determined to enter the low-temperature mode in response to the temperature being lower than a first threshold temperature and the failure of reading data from the memory device. For example, as shown in FIGS. 1 and 6, memory controller 106 may detect data read failure, as well as obtain TEMP from temperature sensor 110 and determine to enter the low-temperature mode in response to TEMP being lower than T1 with data read failure.

In some implementations, a first instruction to enter the low-temperature mode is received from a host. In some implementations, the first instruction is made by the host in response to the temperature being lower than a first threshold temperature. For example, as shown in FIGS. 1 and 7, memory controller 106 may receive a low-temperature mode entering instruction from host 108 and determine to enter the low-temperature mode according to the instruction.

Method 800 proceeds to operation 804, as illustrated in FIG. 8, in which in the low-temperature mode, at least one of the memory device or the memory controller is controlled to execute a preset idling operation to increase the temperature associated with the memory device. For example, as shown in FIG. 1, memory controller 106 may control memory controller 106 and/or memory device 104 to execute a preset idling operation to increase the temperature associated with memory device 104. In some implementations, the memory controller is controlled to execute redundant arithmetic operations. For example, as shown in FIG. 1, memory controller 106 may execute redundant arithmetic operations to indirectly increase the temperature associated with memory device 104 through heat transfer within the package of memory system 102. In some implementations, the memory device is controlled to execute redundant read operations. For example, as shown in FIG. 1, memory device 104 may execute redundant read operations to directly increase the temperature associated with memory device 104.

In some implementations, a portion of a full capacity of the memory device is determined based on the temperature. In some implementations, the at least one of the memory device or the memory controller is controlled to execute the preset idling operation at the portion of a full capacity, and to execute a normal operation at the rest of the full capacity. For example, as shown in FIG. 1, memory controller 106 may determine the portion of the full capacity of memory device 104 for executing the preset idling operation based on the temperature associated with memory device 104 and a target temperature and control memory device 104 and/or memory controller 106 to execute the preset idling operation at the portion of a full capacity and to execute a normal operation at the rest of the full capacity.

Method 800 proceeds to operation 806, as illustrated in FIG. 8, in which the low-temperature mode is exited. Method 800 proceeds to operation 808, as illustrated in FIG. 8, in which the preset idling operation is terminated. For example, as shown in FIG. 1, memory controller 106 may exit the low-temperature mode is exited and terminate the preset idling operation afterward.

In some implementations, it is determined to exit the low-temperature mode in response to the temperature being higher than a second threshold temperature for a preset time period. For example, as shown in FIGS. 1 and 5, in the low-temperature mode, memory controller 106 may monitor TEMP from temperature sensor 110 and determine to exit the low-temperature mode and terminate the idling operation in response to TEMP being higher than T2 for T.

In some implementations, it is determined to exit the low-temperature mode in response to a success of reading data from the memory device. For example, as shown in FIGS. 1 and 6, in the low-temperature mode, memory controller 106 may retry to read data from memory device 104 and determine to exit the low-temperature mode and terminate the idling operation in response to read data success after the retry.

In some implementations, a second instruction to exit the low-temperature mode is received from the host. In some implementations, the second instruction is made by the host in response to the temperature being higher than a second threshold temperature for a preset time period. For example, as shown in FIGS. 1 and 8, memory controller 106 may receive a low-temperature mode exiting instruction from host 108 and determine to exit the low-temperature mode and terminate the idling operation according to the instruction.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a memory controller, such as memory controller 300 in FIG. 3A. By way of example, and not limitation, such computer-readable media can include RAM, ROM, electrically erasable programmable ROM (EEPROM), compact disc read-only memory (CD-ROM) or other optical disk storage, hard disk drive (HDD), such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, include CD, laser disc, optical disc, digital video disc (DVD), and floppy disk where disks usually reproduce data magnetically, while discs reproduce data optically with lasers. Combinations of the above should also be included within the scope of computer-readable media.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents.

Although specific configurations and arrangements are discussed, it should be understood that this is done for illustrative purposes only. As such, other configurations and arrangements can be used without departing from the scope of the present disclosure. Also, the subject matter as described in the present disclosure can also be used in a variety of other applications. Functional and structural features as described in the present disclosures can be combined, adjusted, modified, and rearranged with one another and in ways that are consistent with the scope of the present disclosure.

What is claimed is:

1. A memory system, comprising:
a memory device; and
a memory controller coupled to the memory device and configured to:
enter a low-temperature mode based on a temperature associated with the memory device;
in the low-temperature mode, control at least one of the memory device or the memory controller to execute a preset idling operation, at a portion of a full capacity of the at least one of the memory device or the memory controller, to increase the temperature associated with the memory device, wherein the full capacity of the at least one of the memory device or the memory controller is defined based on available resources that handle operations of the at least one of the memory device or the memory controller, and the resources that handle operations include at least one of data bandwidth, processing power, or storage space;

determine the portion of the full capacity based on the temperature; and control the at least one of the memory device or the memory controller to execute a host read, program, or erase operation at a rest of the full capacity of the at least one of the memory device or the memory controller.

2. The memory system of claim 1, wherein to control the at least one of the memory device or the memory controller, the memory controller is further configured to execute redundant arithmetic operations.

3. The memory system of claim 1, wherein to control the at least one of the memory device or the memory controller, the memory controller is further configured to cause the memory device to execute redundant read operations.

4. The memory system of claim 1, wherein the memory controller is further configured to:

obtain the temperature associated with the memory device; and determine to enter the low-temperature mode in response to the temperature being lower than a first threshold temperature when initializing the memory system.

5. The memory system of claim 1, wherein the memory controller is further configured to:

determine a failure of reading data from the memory device;

obtain the temperature associated with the memory device; and determine to enter the low-temperature mode in response to the temperature being lower than a first threshold temperature and the failure of reading data from the memory device.

6. The memory system of claim 1, wherein the memory controller is further configured to receive a first instruction to enter the low-temperature mode from a host, the first instruction being made by the host in response to the temperature being lower than a first threshold temperature.

7. The memory system of claim 1, wherein the memory controller is further configured to:

exit the low-temperature mode; and terminate the preset idling operation after exiting the low-temperature mode.

8. The memory system of claim 7, wherein the memory controller is further configured to determine to exit the low-temperature mode in response to the temperature being higher than a second threshold temperature for a preset time period.

9. The memory system of claim 7, wherein the memory controller is further configured to determine to exit the low-temperature mode in response to a success of reading data from the memory device.

10. The memory system of claim 7, wherein the memory controller is further configured to receive a second instruction to exit the low-temperature mode from a host, the second instruction being made by the host in response to the temperature being higher than a second threshold temperature for a preset time period.

11. A memory controller, comprising:

an interface configured to communicate with a memory device;

internal memory configured to store instructions; and a processor coupled to the internal memory and the interface and configured to execute the instructions to perform a process comprising:

entering a low-temperature mode based on a temperature associated with a memory device;

in the low-temperature mode, controlling at least one of the memory device or the memory controller to execute a preset idling operation, at a portion of a full capacity of the at least one of the memory device or the memory controller, to increase the temperature associated with the memory device, wherein the full capacity of the at least one of the memory device or the memory controller is defined based on available resources that handle operations of the at least one of the memory device or the memory controller, and the resources that handle operations include at least one of data bandwidth, processing power, or storage space;

determining the portion of the full capacity based on the temperature; and controlling the at least one of the memory device or the memory controller to execute a host read, program, or erase operation at a rest of the full capacity of the at least one of the memory device or the memory controller.

12. The memory controller of claim 11, wherein the process further comprises:

obtaining the temperature associated with the memory device; and determining to enter the low-temperature mode in response to the temperature being lower than a first threshold temperature when initializing the memory device.

13. The memory controller of claim 11, wherein the process further comprises:

determining a failure of reading data from the memory device;

obtaining the temperature associated with the memory device; and determining to enter the low-temperature mode in response to the temperature being lower than a first threshold temperature and the failure of reading data from the memory device.

14. The memory controller of claim 11, wherein the interface is further configured to receive a first instruction to enter the low-temperature mode from a host, the first instruction being made by the host in response to the temperature being lower than a first threshold temperature.

15. The memory controller of claim 11, wherein the process further comprises:

exiting the low-temperature mode; and terminating the preset idling operation after exiting the low-temperature mode.

16. The memory controller of claim 11, wherein controlling the at least one of the memory device or the memory controller comprises executing redundant arithmetic operations.

17. A method for operating a memory controller, comprising:

entering a low-temperature mode based on a temperature associated with a memory device;

in the low-temperature mode, controlling at least one of the memory device or the memory controller to execute a preset idling operation, at a portion of a full capacity of the at least one of the memory device or the memory controller, to increase the temperature associated with the memory device, wherein the full capacity of the at least one of the memory device or the memory controller is defined based on available resources that handle operations of the at least one of the memory device or the memory controller, and the resources, that handle operations include at least one of data bandwidth, processing power, or storage space;

determining the portion of the full capacity based on the temperature; and controlling the at least one of the memory device or the memory controller to execute a host read, program, or erase operation at a rest of the full capacity of the at least one of the memory device or the memory controller.

\* \* \* \* \*